United States Patent [19]

Yoneyama et al.

[11] Patent Number: 5,793,533
[45] Date of Patent: Aug. 11, 1998

[54] ZOOM LENS SYSTEM

[75] Inventors: Shuji Yoneyama; Takayuki Ito, both of Tokyo, Japan

[73] Assignee: Asahi Kogaku Kogyo Kabushiki Kaisha, Tokyo, Japan

[21] Appl. No.: 136,255

[22] Filed: Oct. 15, 1993

[30] Foreign Application Priority Data

Oct. 15, 1992 [JP] Japan .................................. 4-277083

[51] Int. Cl.$^6$ ...................................... G02B 15/14
[52] U.S. Cl. ........................... 359/689; 359/686; 359/683
[58] Field of Search ........................ 359/686, 689, 359/683

[56] References Cited

U.S. PATENT DOCUMENTS

| | | |
|---|---|---|
| 4,773,744 | 9/1988 | Yamanashi . |
| 5,004,329 | 4/1991 | Tsuchida . |
| 5,260,833 | 11/1993 | Ito et al. ................................. 359/689 |
| 5,278,699 | 1/1994 | Ito et al. ................................. 359/692 |
| 5,315,439 | 5/1994 | Ito ........................................... 359/689 |

FOREIGN PATENT DOCUMENTS

| | | |
|---|---|---|
| 478810 | 3/1992 | Japan . |
| 478811 | 3/1992 | Japan . |
| 478812 | 3/1992 | Japan . |
| 4-221491 | 3/1994 | Japan ................................... 359/689 |

OTHER PUBLICATIONS

British Search Report GB 9321381.7.
Meiron, "On the Design of Optical Systems Containing Aspamic Surkalob", J. Of Optical Soc. of Amer., vol.46, No. 4 Apr. 1956, pp. 288–292.

Primary Examiner—Georgia Y. Epps
Attorney, Agent, or Firm—Sughrue, Mion, Zinn, Macpeak & Seas, PLLC

[57] ABSTRACT

The improved zoom lens system comprises, in order from the object side, a positive first lens group, a positive second lens group and a negative third lens group, the third lens group having a biaspheric positive lens element on the side the closest to the object that has a convex surface directed towards the image and the third lens group further including at least one negative lens element that has a concave surface directed towards the object, and the system is further characterized in that all lens groups are moved towards the object during a zoom from the wide-angle end to the narrow-angle end, and the following conditions are satisfied: (a) $0<\Delta X_{3G1}/fs$; (b) $-0.75<\Delta X_{3G2}/\Delta X_{3G1}<0$; (c) $-1.5<r_{3G2}/fs<-0.5$; where $\Delta X_{3G1}$: the amount of asphericity of the surface on the object side of the positive lens element on the object side of the third lens group; $\Delta X_{3G2}$: the amount of asphericity of the surface on the image side of the positive lens element on the object side of the third lens group; $r_{3G2}$: the paraxial radius of curvature of the aspheric surface on the image side of the positive lens element on the object side of the third lens group; and fs: the focal length of the overall system at the wide-angle end.

6 Claims, 8 Drawing Sheets

FIG. 16 though the zoom lens system of the present invention ( sic — layout)

ZOOM LENS SYSTEM

BACKGROUND OF THE INVENTION

This application is based on and claim priority from Japanese Patent Application No. Hei. 4-277083 filed Oct. 15, 1992, the disclosure of which is incorporated herein by reference.

This invention relates to a zoom lens system that is suitable for use with a compact cameras which have small constraint on back focus. More particularly, the invention relates to a zoom lens system that is small in overall size and which is capable of exhibiting a high zoom ratio of at least 3.

Heretofore available zoom lens systems for use with compact cameras that have zoom ratios of about 3 consist of three groups, either positive-positive-negative or negative-positive-negative groups. However, most of these conventional zoom lens systems have had a large overall lens length (distance from the first surface to the image plane) at the narrow-angle end. In the case of lens systems having a small overall length, the back focus is small and the lens diameter of the third lens group is so large that the demand for compactness has not been fully met.

Another problem with the conventional zoom lens systems is that if one attempts to reduce the overall lens length, an increased positive distortion tends to occur.

SUMMARY OF THE INVENTION

The present invention has been accomplished under these circumstances and has an object providing a zoom lens system that is not only reduced in overall lens length and lens diameter to render itself compact as a whole but also adapted to be capable of effective compensation for aberrations.

This object of the present invention can be attained by a zoom lens system that comprises, in order from the object side, a positive first lens group, a positive second lens group, and a negative third lens group third negative lens group which has a positive lens element, which has aspheric surfaces on both sides and is on the side the closest to the object. The positive lens element has a convex surface directed towards the image and the third lens group further includes at least one negative lens element that has a concave surface directed towards the object, all the lens groups are moved towards the object during a zoom from the wide-angle end to the narrow-angle end, and the system satisfies the following conditions:

(a) $0 < \Delta X_{3G1}/fs$ (b) $-0.75 < \Delta X_{3G2}/\Delta X_{3G1} < 0$ (c) $-1.5 < r_{3G2}/fs < -0.5$ where $\Delta X_{3G1}$: the amount of asphericity of the surface on the object side of the positive lens element on the object side of the third lens group;

$\Delta X_{3G2}$: the amount of asphericity of the surface on the image side of the positive lens element on the object side of the third lens group;

$r_{3G2}$: the paraxial radius of curvature of the aspheric surface on the image side of the positive lens element on the object side of the third lens group; and fs: the focal length of the overall system at the wide-angle end.

DESCRIPTION OF THE PREFERRED EMBODIMENTS

Figure 1:
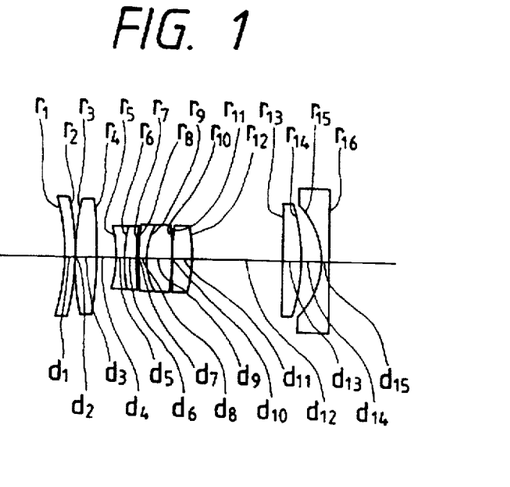
FIG. 1 is a simplified cross-sectional view showing the zoom lens system according to Example 1 of the present invention.
Figure 2:
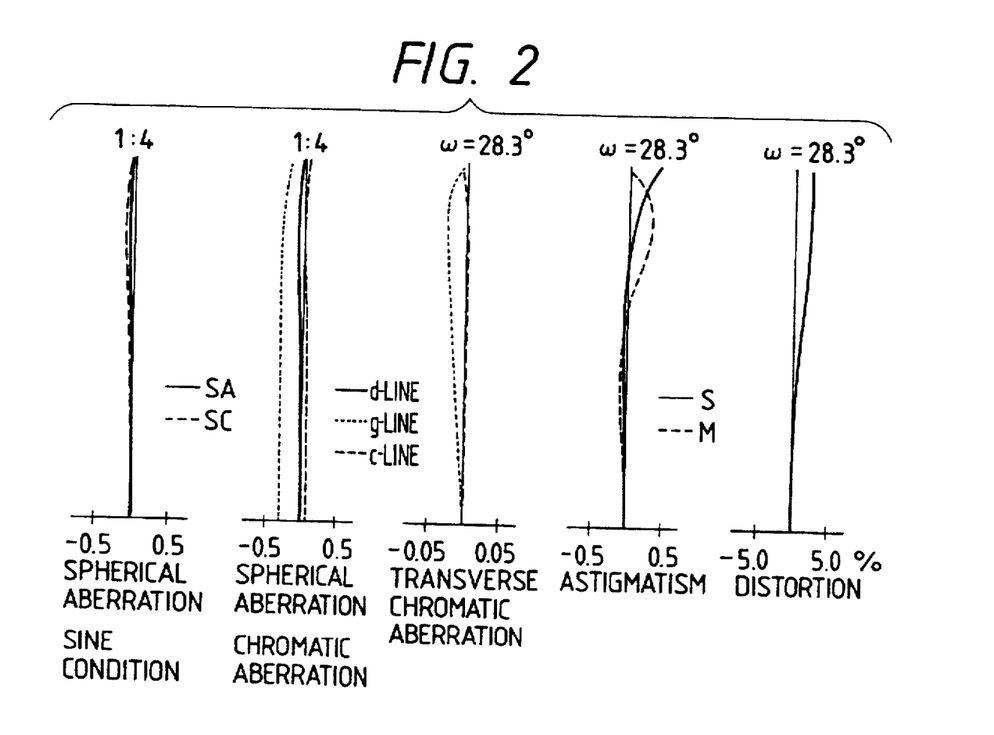
FIGS. 2A through 2E are a set of graphs plotting the curves of various aberrations that occur in the lens system of Example 1 at the wide-angle end.
Figure 3:
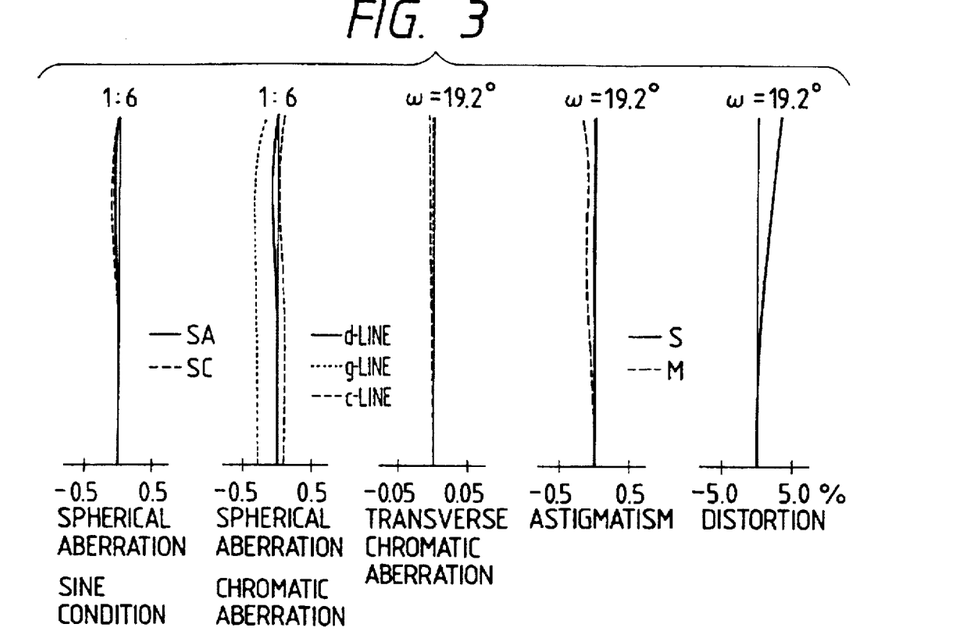
FIGS. 3A through 3E are a set of graphs plotting the curves of various aberrations that occur in the lens system of Example 1 at the middle-angle end.
Figure 4:
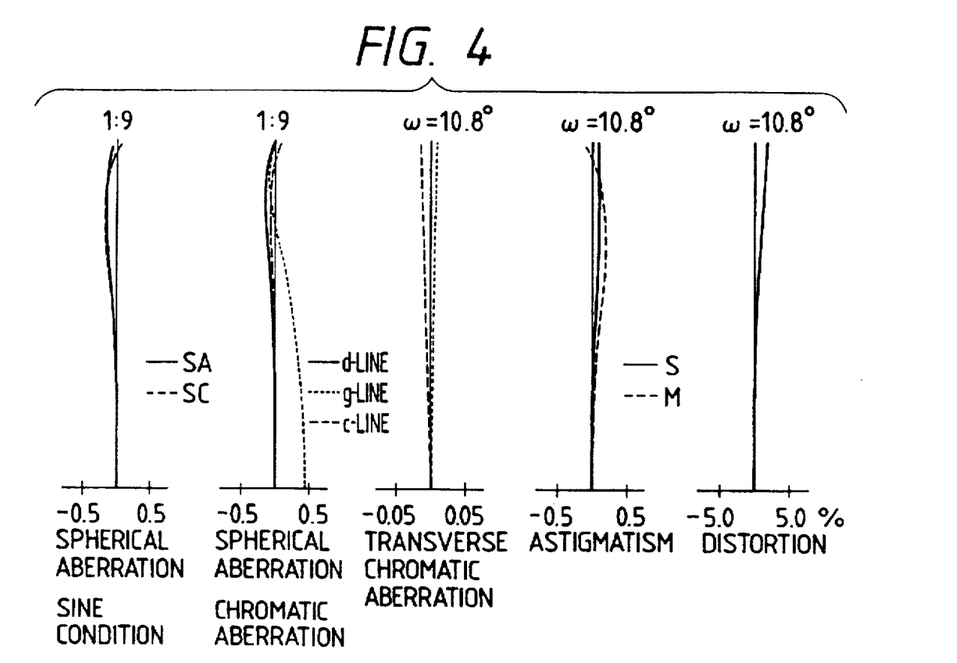
FIGS. 4A through 4E are a set of graphs plotting the curves of various aberrations that occur in the lens system of Example 1 at the narrow-angle end.

The preferred embodiments of the present invention are described below in detail. A typical example of the zoom lens according to the preferred embodiments is shown in FIG. 1 and it comprises, in order from the object side which is on the left of the drawing, a positive first lens group that is composed of two lens elements defined by r1 to r4 surfaces, a positive second lens group that is composed of two cemented lenses and one positive lens element and which is defined by r5 to r12 surfaces, and a negative third lens group that is composed of a biaspheric positive lens element and a negative lens element and which is defined by r13 to r16 surfaces.

By adopting the three-group composition comprising a positive, a positive and a negative group which is advantageous for achieving compactness, not only the overall lens length at the narrow-angle end but also the lens diameter of the third lens group is held to a small value and yet a zoom ratio of about 3 can be attained. Furthermore, distortion can be corrected by adapting the positive lens element on the object side of the third lens group to be aspheric on both surfaces.

Conditions (a) and (b) set forth above define the aspheric shape of the positive lens element on the object side of the third lens group. With the amount of asphericity of the lens surface on the object side being given the positive sign and the amount of asphericity of the surface on the image side the negative sign, both surfaces of said positive lens element are so adapted that the power will increase progressively towards the periphery of the lens, whereby each lens surface is rendered to be capable of correcting distortion. As a result, the aberrations other than distortion can be easily corrected in a balanced way, which is favorable for the purpose of realizing a compact overall system. If the lower limit of condition (b) is not reached, the amount of asphericity of the surface on the image side which has a small radius of curvature becomes excessive, causing increased aberrational variations due to manufacturing errors, etc.

Condition (c) defines the paraxial radius of curvature of the aspheric surface on the image side of the positive lens element which is on the object side of the third lens group. If the upper limit of this condition is exceeded, the radius of curvature of the convex surface on the image side becomes excessive, whereby not only aberrations of higher orders will take place but also the aberrational variations due to errors in the aspheric shape will increase. If the lower limit of condition (c) is not reached, the positive power of the negative third lens group will decrease so that it becomes difficult to achieve effective correction of aberrations in the third lens group, thereby increasing the aberrational variations that can occur during a zoom.

The zoom lens system according to the preferred embodiments further satisfies the following conditions:

(d) $0.1 < \Delta V_{3G1} < 0.5$ (e) $0.0 < \Delta V_{3G2} < 0.3$ where $\Delta V_{3G1}$ is the amount of change in distortion coefficient of the third-order aberration due to the aspheric surface on the object side of the positive lens element which is on the object side of the third lens group, and $\Delta V_{3G2}$ is the amount of change in distortion coefficient of the third-order aberration due to the aspheric surface on the image side of said positive lens element, provided that both parameters are calculated on the assumption that the focal length of the overall system is 1.0 at the wide-angle end.

Conditions (d) and (e) further define the aspheric shape of the positive lens element on the object side of the third lens group. If the lower limit of either condition is not reached, distortion is undercorrected. If the upper limit of either condition is exceeded, the result is favorable for the purpose of correcting distortion but, on the other hand, it is difficult to correct other aberrations such as spherical aberration. It should be noted here that the aspheric surface on the image side has a smaller radius of curvature and causes greater effects on aberrations than the aspheric surface on the object side and that, therefore, from the viewpoint of ease in manufacture, the amount of asphericity of the surface on the image side is preferably smaller than that of the surface on the object side and this is effective in suppressing the aberrational variations due to manufacturing errors.

In the preferred embodiments, the positive lens element on the object side of the third lens group is made of a plastic material and satisfies the following condition:

(f) $0.3 < f_S/f_{3GP} < 0.8$ where $f_{3GP}$ is the focal length of the plastic lens.

Condition (f) defines the power of the positive lens element on the object side of the third lens group. Since both surfaces of this lens element are aspheric, the aberrations that occur in the third lens group can be corrected without increasing the power and, even if the plastic lens is used, aberrational variations due to power changes that occur in response to changes in temperature, humidity, etc. can be suppressed. If the upper limit of condition (f) is exceeded, the power of the plastic lens becomes excessive and the power changes due to changes in temperature, humidity, etc. are so great as to cause undesired aberrational variations. If the lower limit of condition (f) is not reached, the positive power that can be attained is too small to correct effectively the aberrations that occur in the third lens group which has a negative overall power.

In order to increase the power of the second lens group without unduly increasing its thickness, the second lens group preferably comprises, in order from the object side, a negative first sub-group 2a and a positive second sub-group 2b, each including at least a cemented lens consisting of a negative and a positive lens element, and further satisfies the following conditions:

(g) $0.9 < f_S/f_{2G} < 1.4$ (h) $40 < v_{2GaN}$ (i) $v_{2GbN} < 40$ where $f_{2G}$: the focal length of the second lens group;

$v_{2GaN}$: the Abbe number of the negative lens element of the cemented lens in the negative sub-group 2a; and $v_{2GbN}$: the Abbe number of the negative lens element of the cemented lens in the positive sub-group 2b.

Condition (g) defines the power of the second lens group. If the upper limit of this condition is exceeded, the aberrational variations that occur during a zoom will increase. If the lower limit of condition (g) is not reached, the overall lens system becomes bulky.

Conditions (h) and (i) define the dispersion of the negative lens element of the cemented lens in the second lens group. If these conditions are met, the power of the second lens group can be increased without unduly increasing its thickness.

The lens system according to the preferred embodiments satisfies the following additional condition (j) and, furthermore, the second sub-group 2b includes at least one aspheric surface that satisfies the following condition (k):

(j) $0.2 < \Sigma d_{2G}/f_S < 0.4$ (k) $-35 < \Delta I_{2Gb} < -5$ where $\Sigma d_2 G$: the sum of the distances between surfaces in the second lens group; and $\Delta I_{2Gb}$: the amount of change in spherical aberration coefficient of the third-order aberration due to the aspheric surface in the second sub-group 2b.

Condition (j) defines directly the sum of the distances between surfaces in the second lens group. If the upper limit of this condition is exceeded, the second lens group will become bulky. If the lower limit of condition (j) is not reached, it becomes difficult to assure the necessary edge thickness.

Condition (k) defines the aspheric shape of the second sub-group 2b. If a divergent aspheric surface that satisfies this condition is provided in the second sub-group 2b which is located close to a diaphragm stop, the thickness of the second lens group is reduced while, at the same time, it is possible to correct the spherical aberration that occurs on account of increased power. If the upper limit of condition (k) is exceeded, the effectiveness of the aspheric surface in correcting the spherical aberration is small. If the lower limit of condition (k) is not reached, overcorrection of the spherical aberration will occur.

In Examples 2, 3 and 4, the first and third lens groups are adapted to be movable in unison and this is an advantageous design that features a simplified mechanism.

The amount of variation in the coefficient of the third order aberration due to the aspheric surface will now be described. The shape of the aspheric surface can be generally expressed as follows.

$$X = \frac{CY^2}{1 + \sqrt{1 - (1+K)C^2Y^2}} + A_4Y^4 + A_6Y^6 + A_8Y^8 + A_{10}Y^{10} + \ldots$$

When the conic constant K is 0, the following equation is obtained:

$$X = \frac{CY^2}{1 + \sqrt{1 - C^2Y^2}} + B_4Y^4 + B_6Y^6 + B_8Y^8 + B_{10}Y^{10} + \ldots$$

Where $$B_4 = A_4 + \frac{1}{8}KC^3, B_6 = A_6 + \frac{1}{16}(K^2 + 2K)C^5,$$

$$B_8 = A_8 + \frac{5}{128}(K^3 + 3K^2 + 3K)C^7, \text{ and}$$

$$B_{10} = A_{10} + \frac{7}{256}(K^4 + 4K^3 + 6K + 4K)C^9$$

when the focal length f is 1.0, the resultant value is transformed as follows. Namely, substitute the following equations into the above equation:

$$X = \frac{x}{f}, Y = \frac{y}{f}, C = fc$$

$\alpha_4 = f^3 B_4$, $\alpha_6 = f^5 B_6$, $\alpha_8 = f^7 B_8$, $\alpha_{10} = f^9 B_{10}$
In this way, the following equation is obtained.

$$X = \frac{CY^2}{1 + \sqrt{1 - C^2Y^2}} + \alpha_4Y^4 + \alpha_6Y^6 + \alpha_8Y^8 + \alpha_{10}Y^{10} + \ldots$$

The second and subsequent terms define the amount of asphericity of the aspheric surface.

The relationship between the coefficient $A_4$ of the second term and the coefficient of the third-order aspheric surface is $\Phi$ expressed by:

$$\Phi = 8 (N'-N) \alpha_4$$

where N is the refractive index where the aspheric surface is not provided, and N' is the refractive index where the aspheric surface is provided.

The coefficient of the aspheric surface $\Phi$ provides the following amounts of variation in the coefficients of the various kinds of third-order aberration.

$\Delta I = h^4 \Phi$ $\Delta II = h^3 \bar{h} \Phi$ $\Delta III = h^2 \bar{h}^2$ $\Delta IV = h^2 \bar{h}^2 \Phi$ $\Delta V = h \bar{h}^3 \Phi$ where I is the spherical aberration coefficient, II is the coma coefficient, III is the astigmatism coefficient, IV is the curved surface coefficient of spherical image absent surface, V is a distortion coefficient, h is the height of paraxial on-axis rays passing through each lens surface, and $\bar{h}$ is the height of paraxial and off-axis rays passing through the center of the pupil and each lens surface.

The shape of aspheric surface can be expressed by various other equations but when y is smaller than the paraxial radius of curvature, satisfactory approximation can be achieved by even-order terms alone. Hence, it should be understood that the applicability of the present invention is in no way compromised by merely changing the equations for expressing the shape of the aspheric surface.

The following examples are provided for the purpose of further illustrating the present invention but are in no way to be taken as limiting.

EXAMPLE 1

FIG. 1 is a simplified cross-sectional view showing diagrammatically the composition of the zoom lens system according to Example 1. Specific numerical data are given in Tables 1 and 2 below, wherein f denotes the focal length, fB the back focus, FNO. the F number, ω the half view angle, r the radius of curvature, d the lens thickness or airspace, n the refractive index at the d-line (588 nm), and ν the Abbe number.

FIGS. 2A through 2E are a set of graphs plotting the curves of various aberrations that occur in the lens system at the wide-angle end; the aberrations illustrated are spherical aberration SA, sine condition SC, chromatic aberrations as expressed by spherical aberrations at the d-, g- and c-lines, lateral chromatic aberration, astigmatism (S, sagittal; M, meridional), and distortion.

FIGS. 3A through 3E and FIGS. 4A through 4E are sets of graphs plotting the curves of these aberrations that occur in the lens system at the middle-angle and telephoto ends, respectively.

Surfaces 12, 13 and 14 in the lens system are aspheric. The shape of an aspheric surface can generally be expressed by the following equation:

$$X = (CY^2/(1 + \sqrt{1-(1+K)C^2Y^2})) + A_4Y^4 + A_6Y^6 + A_8Y^8 + A_{10}Y^{10}$$

where X is the distance by which the coordinates at the point on the aspheric surface where the height from the optical axis is Y are departed from the plane tangent to the vertex of the aspheric surface; C is the curvature (1/r) of the vertex of the aspheric surface; K is the conic constant; and A4, A6, A8 and A10 are the aspheric coefficients of the fourth, sixth, eighth and tenth orders, respectively.

The aspheric coefficients of surfaces 12, 13 and 14 are listed in Table 3.

In Table 1, a stop diaphragm is located 0.90 mm from the twelfth surface toward the image side.

TABLE 1

| Surface No. | r | d | n | v |
|---|---|---|---|---|
| 1 | −31.706 | 1.30 | 1.84666 | 23.8 |
| 2 | −44.598 | 0.10 | | |
| 3 | 31.662 | 3.30 | 1.48749 | 70.2 |
| 4 | −58.132 | variable | | |
| 5 | −16.515 | 1.40 | 1.78590 | 44.2 |
| 6 | 16.671 | 1.94 | 1.80518 | 25.4 |
| 7 | 65.423 | 0.20 | | |
| 8 | 23.200 | 1.40 | 1.62004 | 36.3 |
| 9 | 9.551 | 3.67 | 1.58913 | 61.2 |
| 10 | −85.422 | 0.20 | | |
| 11 | 53.188 | 2.93 | 1.58913 | 61.2 |
| 12 | −17.646 | variable | | |
| 13 | −248.492 | 2.86 | 1.58547 | 29.9 |
| 14 | −32.136 | 3.32 | | |
| 15 | −11.512 | 1.50 | 1.77250 | 49.6 |
| 16 | −318.112 | | | |

TABLE 2

| f | 39.30 | 60.00 | 111.00 |
|---|---|---|---|
| fB | 11.17 | 25.07 | 57.52 |
| FNo. | 1:4 | 1:6 | 1:9 |
| ω | 28.3° | 19.2° | 10.8° |
| d4 | 3.14 | 8.60 | 14.88 |
| d12 | 13.88 | 8.41 | 2.67 |

TABLE 3

| Surface 12 | Surface 13 | Surface 14 |
|---|---|---|
| K = 0.000000 | K = −0.100000 × 10 | K = 0.000000 |
| A4 = 0.630085 × $10^{-4}$ | A4 = 0.539342 × $10^{-4}$ | A4 = −0.151596 × $10^{-4}$ |
| A6 = −0.516754 × $10^{-7}$ | A6 = 0.991590 × $10^{-7}$ | A6 = −0.138459 × $10^{-6}$ |
| A8 = 0.105593 × $10^{-8}$ | A8 = −0.142415 × $10^{-8}$ | A8 = 0.000000 |
| A10 = 0.000000 | A10 = 0.346817 × $10^{-10}$ | A10 = 0.000000 |

EXAMPLE 2

Figure 5:
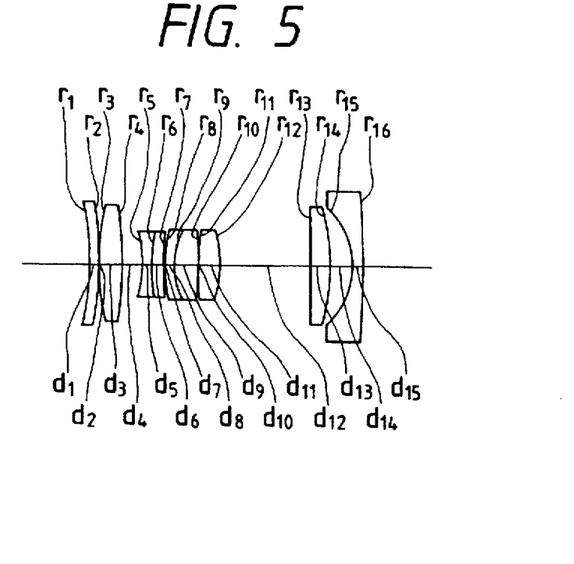
FIG. 5 is a simplified cross-sectional view showing the zoom lens system according to Example 2 of the present invention.
Figure 6:
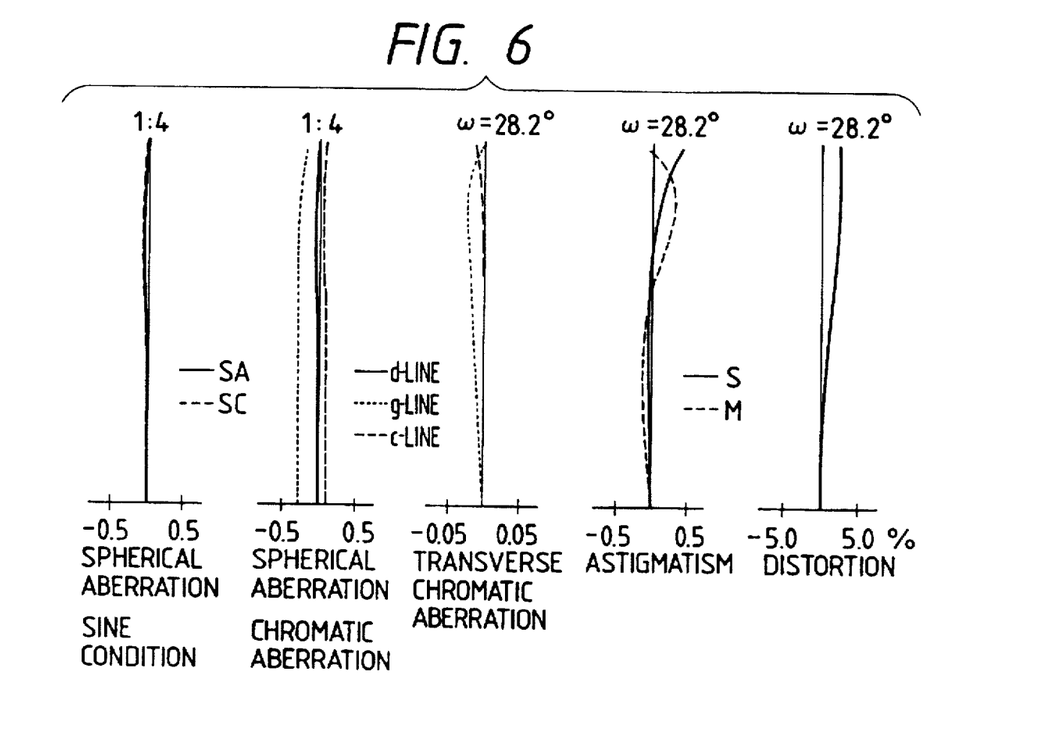
FIGS. 6A through 6E are a set of graphs plotting the curves of various aberrations that occur in the lens system of Example 2 at the wide-angle end.
Figure 7:
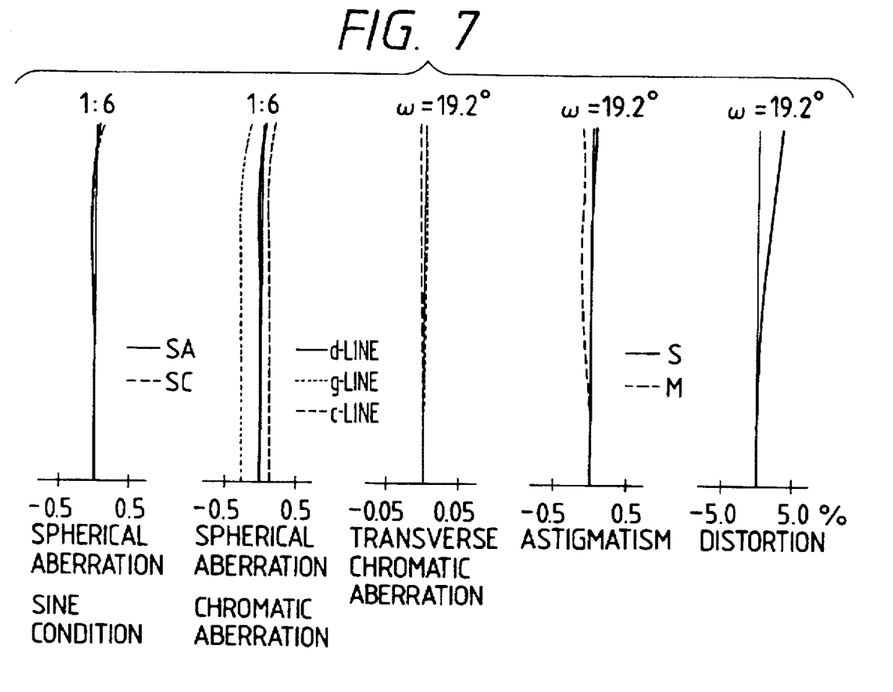
FIGS. 7A through 7E are a set of graphs plotting the curves of various aberrations that occur in the lens system of Example 2 at the middle-angle end.
Figure 8:
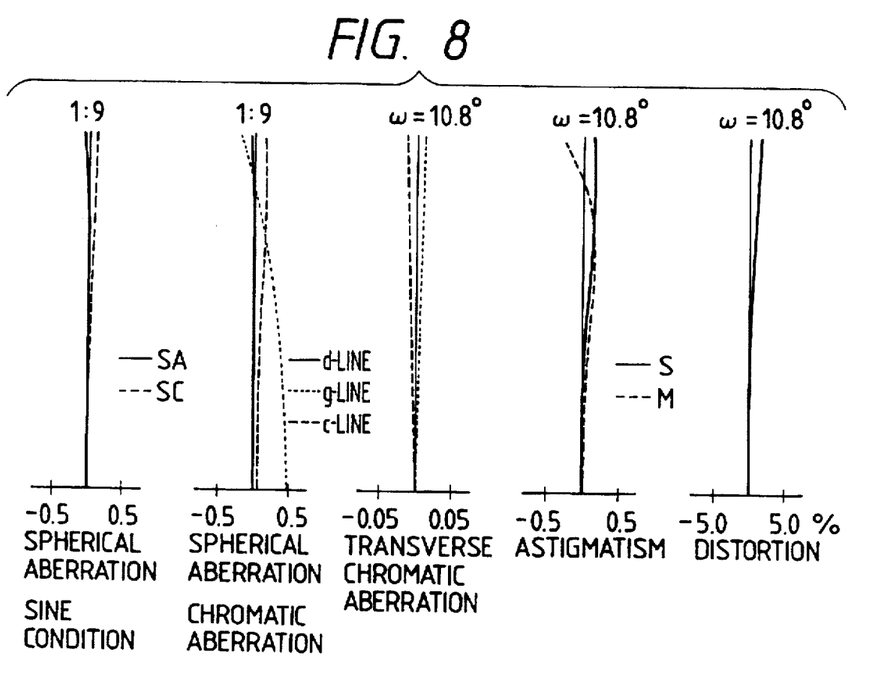
FIGS. 8A through 8E are a set of graphs plotting the curves of various aberrations that occur in the lens system of Example 2 at the narrow-angle end.

FIG. 5 is a simplified cross-sectional view showing diagrammatically the composition of the zoom lens system according to Example 2 of the present invention. Specific numerical data are given in Tables 4 and 5. FIGS. 6A through 6E, FIGS. 7A through 7E, and FIGS. 8A through 8E are three sets of graphs plotting the curves of various aberrations that occur in the lens system at the wide-angle, middle-angle and narrow-angle ends, respectively.

In the lens system of Example 2, surfaces 12, 13 and 14 are aspheric and their aspheric coefficients are listed in Table 6.

In Table 4, a stop diaphragm is located 0.90 mm from the twelfth surface toward the image side.

TABLE 4

| Surface No. | r | d | n | v |
|---|---|---|---|---|
| 1 | −36.926 | 1.30 | 1.84666 | 23.8 |
| 2 | −54.506 | 0.10 | | |
| 3 | 30.747 | 3.20 | 1.48749 | 70.2 |
| 4 | −71.646 | variable | | |
| 5 | −16.076 | 1.40 | 1.71700 | 47.9 |
| 6 | 17.974 | 1.78 | 1.80518 | 25.4 |
| 7 | 43.772 | 0.20 | | |
| 8 | 21.515 | 1.40 | 1.69895 | 30.1 |
| 9 | 10.605 | 3.39 | 1.62230 | 53.2 |
| 10 | −92.682 | 0.20 | | |
| 11 | 53.188 | 2.93 | 1.58913 | 61.2 |
| 12 | −17.646 | variable | | |
| 13 | −105.666 | 3.00 | 1.58547 | 29.9 |
| 14 | −26.048 | 3.03 | | |
| 15 | −11.030 | 1.50 | 1.77250 | 49.6 |
| 16 | −155.697 | | | |

TABLE 5

| f | 39.30 | 60.00 | 111.00 |
|---|---|---|---|
| fB | 11.00 | 24.86 | 57.03 |
| FNo. | 1:4 | 1:6 | 1:9 |
| ω | 28.2° | 19.2° | 10.8° |
| d4 | 3.19 | 9.18 | 16.15 |
| d12 | 13.84 | 8.36 | 2.58 |

TABLE 6

| Surface 12 | Surface 13 | Surface 14 |
|---|---|---|
| K = 0.000000 | K = −0.100000 × 10 | K = 0.000000 |
| A4 = 0.630085 × $10^{-4}$ | A4 = 0.599608 × $10^{-4}$ | A4 = −0.150353 × $10^{-4}$ |
| A6 = −0.516754 × $10^{-7}$ | A6 = −0.151541 × $10^{-6}$ | A6 = −0.353870 × $10^{-6}$ |
| A8 = 0.105593 × $10^{-8}$ | A8 = 0.434336 × $10^{-8}$ | A8 = 0.253505 × $10^{-8}$ |
| A10 = 0.000000 | A10 = 0.1521904 × $10^{-10}$ | A10 = 0.000000 |

EXAMPLE 3

Figure 9:
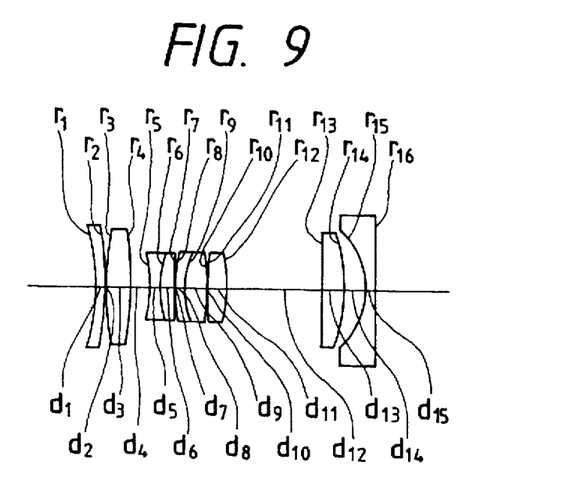
FIG. 9 is a simplified cross-sectional view showing the zoom lens system according to Example 3 of the present invention.
Figure 10:
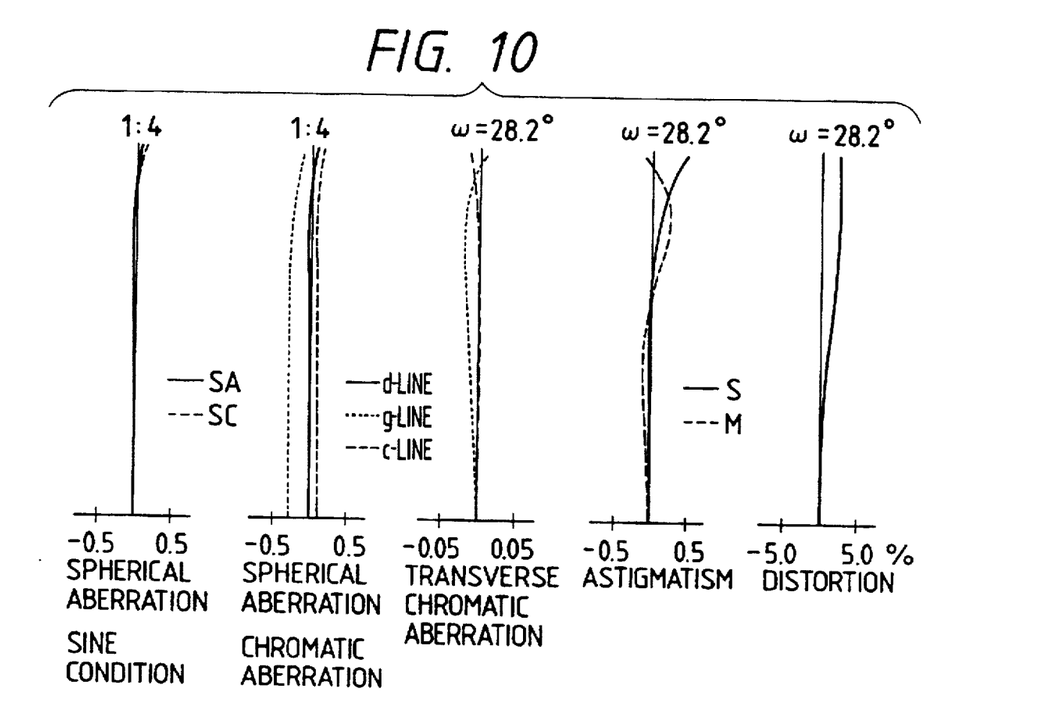
FIGS 10A through 10E are a set of graphs plotting the curves of various aberrations that occur in the lens system of Example 3 at the wide-angle end.
Figure 11:
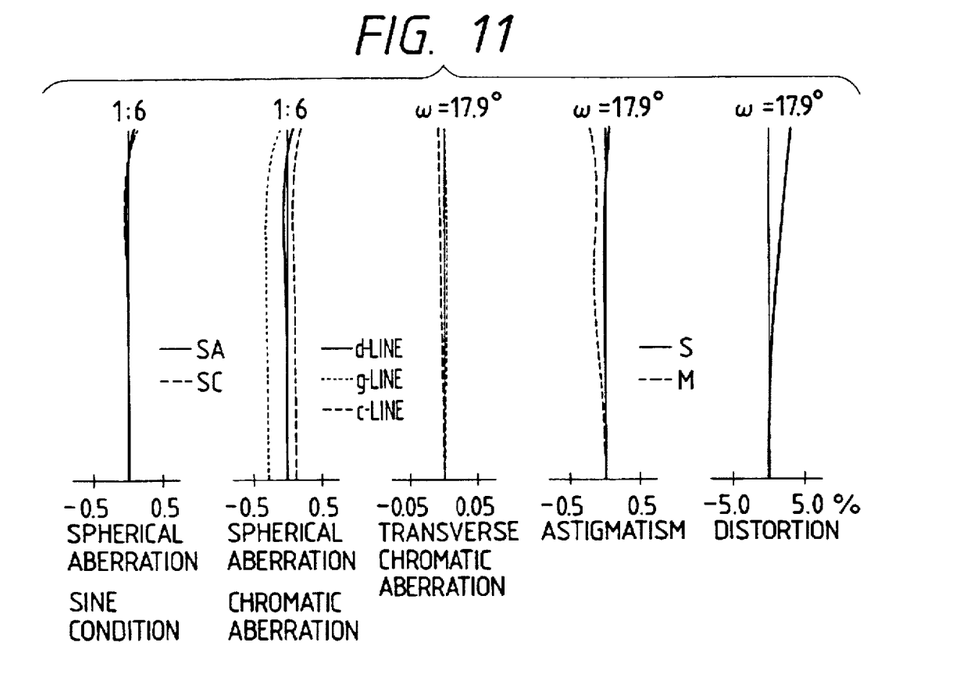
FIGS. 11A through 11E are a set of graphs plotting the curves of various aberrations that occur in the lens system of Example 3 at the middle-angle end.
Figure 12:
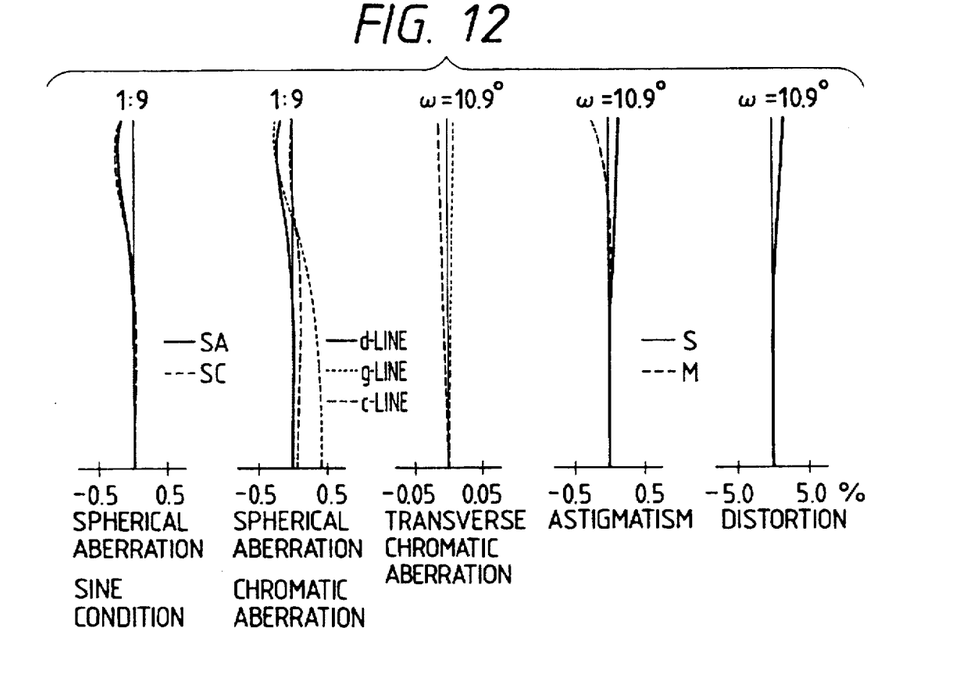
FIG. 12A through 12E are a set of graphs plotting the curves of various aberrations that occur in the lens system of Example 3 at the narrow-angle end.

FIG. 9 is a simplified cross-sectional view showing diagrammatically the composition of the zoom lens system according to Example 3 of the present invention. Specific numerical data are given in Tables 7 and 8. FIGS. 10, 11 and 12 are three sets of graphs plotting the curves of various aberrations that occur in the lens system at the wide-angle, middle-angle and narrow-angle ends, respectively.

In the lens system of Example 3, surfaces 12, 13 and 14 are aspheric and their aspheric coefficients are listed in Table 9.

In Table 7, a stop diaphragm is located 0.90 mm from the twelfth surface toward the image side.

TABLE 7

| Surface No. | r | d | n | v |
|---|---|---|---|---|
| 1 | −32.000 | 1.40 | 1.84666 | 23.8 |
| 2 | −46.204 | 0.10 | | |
| 3 | 31.342 | 3.47 | 1.48749 | 70.2 |
| 4 | −57.377 | variable | | |
| 5 | −16.256 | 1.40 | 1.71700 | 47.9 |
| 6 | 16.256 | 1.84 | 1.80518 | 25.4 |
| 7 | 37.980 | 0.31 | | |
| 8 | 20.750 | 1.40 | 1.68893 | 31.1 |
| 9 | 9.914 | 3.27 | 1.62230 | 53.2 |
| 10 | −102.539 | 0.20 | | |
| 11 | 53.188 | 2.93 | 1.58913 | 61.2 |
| 12 | −17.646 | variable | | |
| 13 | −131.719 | 2.94 | 1.58547 | 29.9 |
| 14 | −28.238 | 3.18 | | |
| 15 | −11.336 | 1.50 | 1.77250 | 49.6 |
| 16 | −210.000 | | | |

TABLE 8

| f | 39.30 | 65.00 | 111.00 |
|---|---|---|---|
| fB | 10.91 | 28.15 | 58.15 |
| FNo. | 1:4 | 1:6 | 1:9 |
| ω | 28.2° | 17.9° | 10.9° |
| d4 | 3.19 | 9.67 | 14.51 |
| d12 | 13.91 | 7.44 | 2.59 |

TABLE 9

| Surface 12 | Surface 13 | Surface 14 |
|---|---|---|
| K = 0.000000 | K = −0.100000 × 10 | K = 0.000000 |
| A4 = 0.630085 × 10$^{-4}$ | A4 = 0.476345 × 10$^{-4}$ | A4 = −0.239783 × 10$^{-4}$ |
| A6 = −0.516754 × 10$^{-7}$ | A6 = 0.365195 × 10$^{-6}$ | A6 = −0.129833 × 10$^{-6}$ |
| A8 = 0.105593 × 10$^{-8}$ | A8 = −0.453219 × 10$^{-8}$ | A8 = −0.265741 × 10$^{-8}$ |
| A10 = 0.000000 | A10 = 0.432496 × 10$^{-10}$ | A10 = 0.000000 |

EXAMPLE 4

Figure 13:
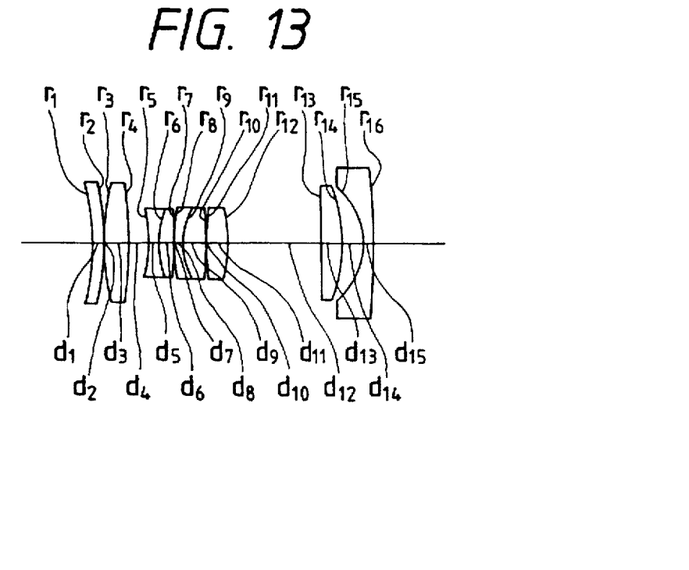
FIG. 13 is a simplified cross-sectional view showing the zoom lens system according to Example 4 of the present invention.
Figure 14:
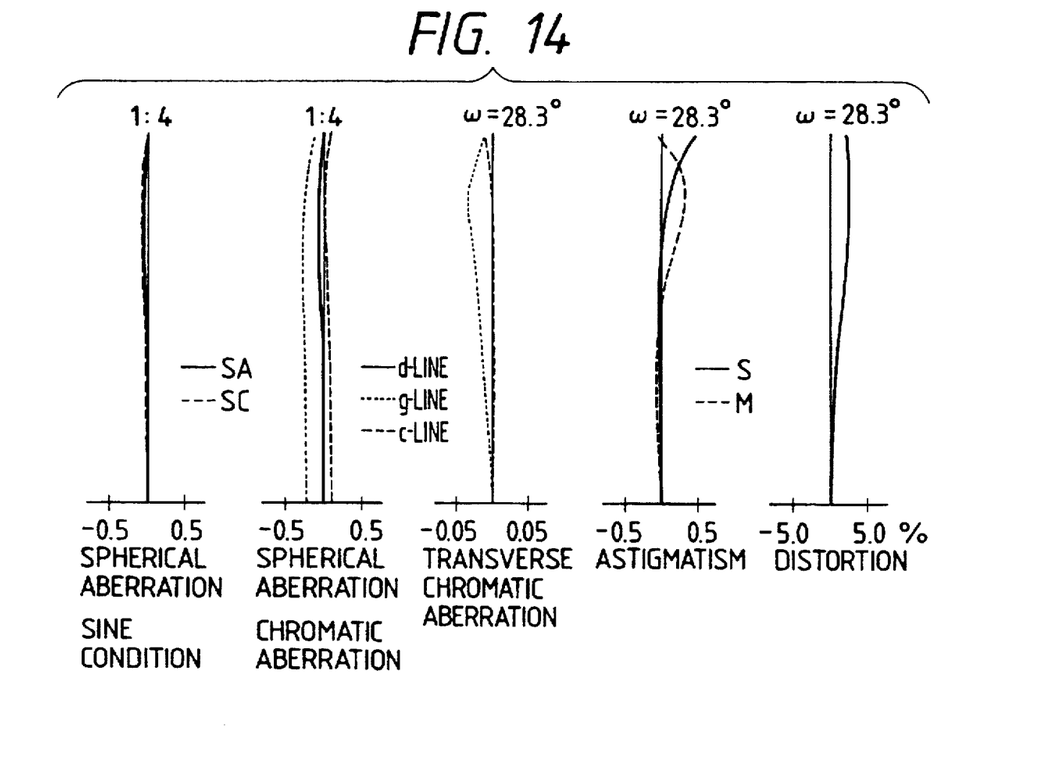
FIGS 14A through 14E are a set of graphs plotting the curves of various aberrations that occur in the lens system of Example 4 at the wide-angle end.
Figure 15:
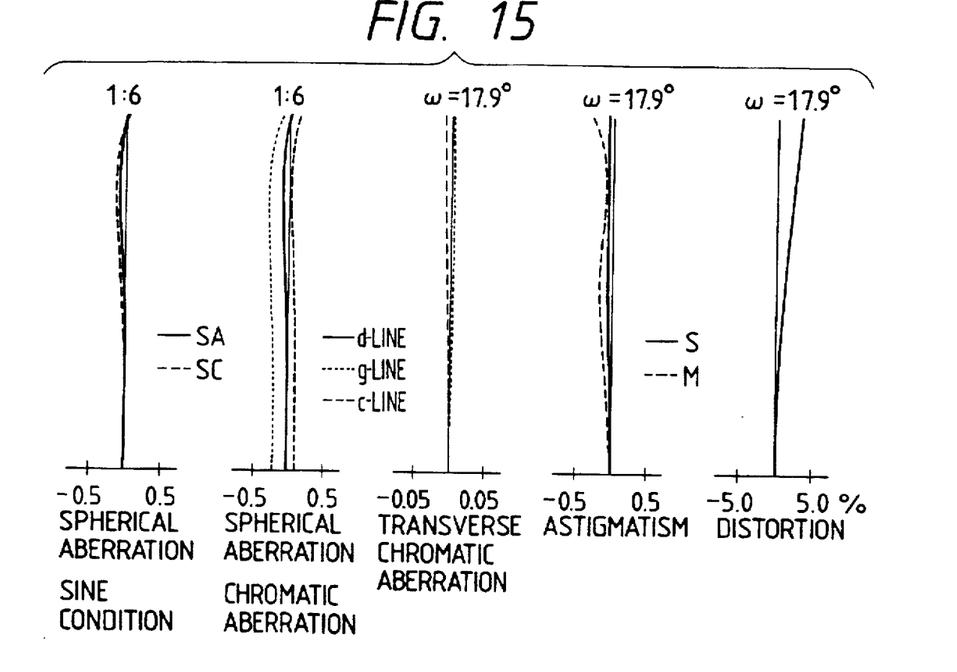
FIGS. 15A through 15E are a set of graphs plotting the curves of various aberrations that occur in the lens system of Example 4 at the middle-angle end.
Figure 16:
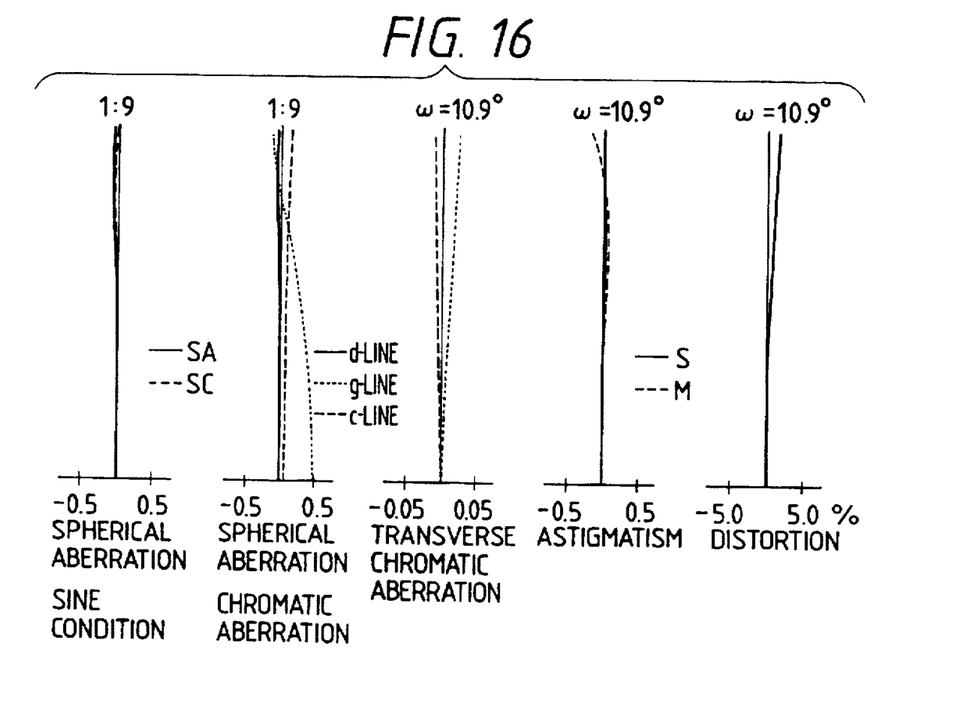
FIGS. 16A through 16E are a set of graphs plotting the curves of various aberrations that occur in the lens system of Example 4 at the narrow-angle end.

FIG. 13 is a simplified cross-sectional view showing diagrammatically the composition of the zoom lens system according to Example 4 of the present invention. Specific numerical data are given in Tables 10 and 11. FIGS. 14A through 14E, FIGS. 15A through 15E, and FIGS. 16A through 16E are three sets of graphs plotting the curves of various aberrations that occur in the lens system at the wide-angle, middle-angle and narrow-angle ends, respectively.

In the lens system of Example 4, surfaces 12, 13 and 14 are aspheric and their aspheric coefficients are listed in Table 12.

In Table 1, a stop diaphragm is located 0.90 mm from the twelfth surface toward the image side.

TABLE 10

| Surface No. | r | d | n | ν |
|---|---|---|---|---|
| 1 | −33.076 | 1.40 | 1.84666 | 23.8 |
| 2 | −45.193 | 0.10 | | |
| 3 | 32.691 | 3.34 | 1.48749 | 70.2 |
| 4 | −63.583 | variable | | |
| 5 | −16.647 | 1.40 | 1.72000 | 43.7 |
| 6 | 16.647 | 1.82 | 1.80518 | 25.4 |
| 7 | 38.823 | 0.20 | | |
| 8 | 19.883 | 1.40 | 1.69895 | 30.1 |
| 9 | 9.694 | 3.25 | 1.62374 | 47.1 |
| 10 | −132.152 | 0.33 | | |
| 11 | 53.188 | 2.93 | 1.58913 | 61.2 |
| 12 | −17.646 | variable | | |
| 13 | −78.828 | 3.00 | 1.58547 | 29.9 |
| 14 | −23.942 | 3.02 | | |
| 15 | −10.890 | 1.50 | 1.77250 | 49.6 |
| 16 | −118.042 | | | |

TABLE 11

| f | 39.30 | 65.00 | 111.00 |
|---|---|---|---|
| fB | 10.61 | 27.97 | 58.17 |
| FNo. | 1:4 | 1:6 | 1:9 |
| ω | 28.3° | 17.9° | 10.9° |
| d4 | 3.08 | 9.70 | 14.66 |
| d12 | 14.31 | 7.69 | 2.74 |

TABLE 12

| Surface 12 | Surface 13 | Surface 14 |
|---|---|---|
| K = 0.000000 | K = 0.100000 × 10 | K = 0.000000 |
| A4 = 0.630085 × 10$^{-4}$ | A4 = 0.560058 × 10$^{-4}$ | A4 = −0.212586 × 10$^{-4}$ |
| A6 = −0.516754 × 10$^{-7}$ | A6 = 0.159977 × 10$^{-6}$ | A6 = 0.963554 × 10$^{-7}$ |
| A8 = 0.105593 × 10$^{-8}$ | A8 = −0.350420 × 10$^{-8}$ | A8 = −0.824290 × 10$^{-8}$ |
| A10 = 0.000000 | A10 = 0.830418 × 10$^{-10}$ | A10 = 0.754321 × 10$^{-10}$ |

The following Table 13 shows how conditions (a) to (k) specified herein are satisfied by respective Examples 1 to 4.

TABLE 13

| | Example 1 | Example 2 | Example 3 | Example 4 |
|---|---|---|---|---|
| (a) $\Delta X_{3G1}/fs$ | 0.0075 | 0.0078 | 0.0067 | 0.0075 |
| (b) $\Delta X_{3G2}/\Delta X_{3G1}$ | −0.41 | −0.43 | −0.50 | −0.46 |
| (c) $r_{3G2}/fs$ | −0.82 | −0.66 | −0.61 | −0.72 |
| (d) $\Delta V_{3G1}$ | 0.27 | 0.31 | 0.25 | 0.32 |
| (e) $\Delta V_{3G2}$ | 0.10 | 0.10 | 0.17 | 0.16 |
| (f) $fs/f_{3GP}$ | 0.62 | 0.67 | 0.65 | 0.68 |
| (9) $fs/f_{2G}$ | 1.13 | 1.14 | 1.11 | 1.09 |
| (h) $V_{2GaN}$ | 44.2 | 47.9 | 47.9 | 43.7 |
| (i) $V_{2GbN}$ | 36.3 | 30.1 | 31.1 | 30.1 |
| (j) $\Sigma d_{2G}/fs$ | 0.30 | 0.29 | 0.29 | 0.29 |
| (k) $\Delta I_{2Gb}$ | −22.1 | −20.3 | −20.5 | −19.9 |

As described on the foregoing pages, the present invention insures that the overall lens length is no more than about 0.9 times the focal length. At the same time, the back focus at the wide-angle end is kept at least 10 mm to assure that the lens diameter of the third lens group will not become unduly large. Because of these two features, the present invention is capable of providing a zoom lens system that is not only compact in overall size but also corrected effectively for the aberrations.

What is claimed is:

1. A zoom lens system that comprises, in order from the object side, a positive first lens group, a positive second lens group, and a negative third lens group, the negative third lens group having a positive lens element, said positive lens element having aspheric surfaces on both sides and being on the side the closest to the object, said positive lens element has a convex surface directed towards the image and the third lens group further including at least one negative lens element that has a concave surface directed towards the object, further characterized in that all lens groups are moved towards the object during a zoom from the wide-angle end to the narrow-angle end, and the system satisfying the following conditions:

(a) $0 < \Delta X_{3G1}/fs$ (b) $-0.75 < \Delta X_{3G2}/\Delta X_{3G1} < 0$ (c) $-1.5 < r_{3G2}/fs < -0.5$ where $\Delta X_{3G1}$: the amount of asphericity of the surface on the object side of the positive lens element on the object side of the third lens group;

$\Delta X_{3G2}$: the amount of asphericity of the surface on the image side of the positive lens element on the object side of the third lens group;

$r_{3G2}$: the paraxial radius of curvature of the aspheric surface on the image side of the positive lens element on the object side of the third lens group; and $f_s$: an overall focal length of the system at the wide-angle end.

2. A zoom lens system according to claim 1 wherein said positive lens element in the third lens group further satisfies the following conditions:

(d) $0.1 < \Delta V_{3G1} < 0.5$ (e) $0.0 < \Delta V_{3G2} < 0.3$ where $\Delta V_{3G1}$: the amount of change in distortion coefficient due to the aspheric surface on the object side, as calculated on the assumption that the focal length of the overall system is 1.0 at the wide-angle end; and $\Delta V_{3G2}$: the amount of change in distortion coefficient of the third-order aberration due to the aspheric surface on the image side, as calculated on the assumption that the focal length of the overall system is 1.0 at the wide-angle end.

3. A zoom lens system according to claim 1 wherein said positive lens element on the object side of the third lens group is made of a plastic material and satisfies the following condition:

(f) $0.3 < fs/f_{3GP} < 0.8$ where $f_{3GP}$ is the focal length of the plastic lens.

4. A zoom lens system according to claim 1 wherein said second lens group comprises, in order from the object side, a negative first sub-group 2a and a positive second sub-group 2b, each including at least a cemented lens consisting of a negative and a positive lens element, and further satisfies the following conditions:

(g) $0.9 < fs/f_{2G} < 1.4$ (h) $40 < v_{2GaN}$ (i) $v_{2GbN} < 40$ where $f_{2G}$: the focal length of the second lens group;

$v_{2GaN}$: the Abbe number of the negative lens element of the cemented lens in the negative sub-group 2a; and $v_{2GbN}$: the Abbe number of the negative lens element of the cemented lens in the positive sub-group 2b.

5. A zoom lens system according to claim 3 which further satisfies the following condition (j) and wherein the second sub-group 2b includes at least one aspheric surface that satieties the following condition (k):

(j) $0.2 < \Sigma d_{2G}/fs < 0.4$ (k) $-35 < \Delta I_{2Gb} < -5$ where $\Sigma d_{2G}$: the sum of the distances between surfaces in the second lens group; and $\Delta I_{2Gb}$: the amount of change in spherical aberration coefficient due to the aspheric surface in the second sub-group 2b.

6. A zoom lens system that comprises, in order from the object side, a positive first lens group, a positive second lens group and a negative third lens group, the third negative lens group having a positive lens element, said positive lens element having aspheric surfaces on both sides and being on the side the closest to the object said positive lens element has a convex surface directed towards the image and the third lens group further including at least one negative lens element that has a concave surface directed towards the object, said positive lens element on the object side of the third lens group is made of a plastic material and satisfies the following condition:

(f) $0.3 < fs/f_{3GP} < 0.8$ where fs is an overall focal length of the system at the wide-angle end and $f_{3GP}$ is the focal length of the plastic lens.

* * * * *